(12) United States Patent
Matsuyama et al.

(10) Patent No.: US 11,059,983 B2
(45) Date of Patent: Jul. 13, 2021

(54) INK, INK CONTAINER, INKJET RECORDING DEVICE, AND RECORDING METHOD

(71) Applicants: Akihiko Matsuyama, Kanagawa (JP);
Yuuki Yokohama, Kanagawa (JP);
Amika Sagara, Kanagawa (JP);
Masaki Kudo, Kanagawa (JP);
Kazuhiko Umemura, Kanagawa (JP);
Yukihiro Imanaga, Kanagawa (JP);
Mayumi Yoshihara, Kanagawa (JP)

(72) Inventors: Akihiko Matsuyama, Kanagawa (JP);
Yuuki Yokohama, Kanagawa (JP);
Amika Sagara, Kanagawa (JP);
Masaki Kudo, Kanagawa (JP);
Kazuhiko Umemura, Kanagawa (JP);
Yukihiro Imanaga, Kanagawa (JP);
Mayumi Yoshihara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 295 days.

(21) Appl. No.: 16/267,442

(22) Filed: Feb. 5, 2019

(65) Prior Publication Data

US 2019/0249020 A1 Aug. 15, 2019

(30) Foreign Application Priority Data

Feb. 9, 2018 (JP) .............................. JP2018-022251
Sep. 28, 2018 (JP) .............................. JP2018-184958
Oct. 30, 2018 (JP) .............................. JP2018-204019

(51) Int. Cl.
*C09D 11/322* (2014.01)
*C09D 11/38* (2014.01)
*C09D 11/102* (2014.01)
*C09D 11/107* (2014.01)
*C09D 11/12* (2006.01)

(52) U.S. Cl.
CPC ............ *C09D 11/322* (2013.01); *C09D 11/38* (2013.01)

(58) Field of Classification Search
CPC ...... C09D 11/322; C09D 11/38; C09D 11/102; C09D 11/107; C09D 11/12
(Continued)

(56) References Cited

U.S. PATENT DOCUMENTS

2012/0207983 A1 8/2012 Matsuyama et al.
2012/0328853 A1 12/2012 Matsuyama et al.
(Continued)

FOREIGN PATENT DOCUMENTS

JP 2014-065872 4/2014
JP 2016-145313 8/2016
(Continued)

*Primary Examiner* — Justin V Lewis
(74) *Attorney, Agent, or Firm* — Oblon, McClelland, Maier & Neustadt, L.L.P.

(57) ABSTRACT

An ink comprises a pigment, a quinacridone derivative represented by the following Chemical formula 1.

Chemical formula 1

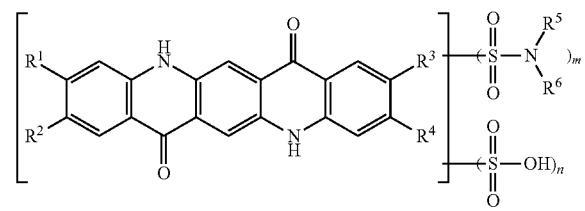

where $R^1$, $R^2$, $R^3$, and $R^4$ each, independently represent hydrogen atoms, halogen atoms, or alkyl groups having 1 to 4 carbon atoms. $R^5$ and $R^6$ each, independently
(Continued)

represent alkyl groups having 1 to 4 carbon atoms, and m and n each, independently represent 0, 1, or 2, excluding a case where both m and n are simultaneously 0, and a solvent A having an SP value of from 9.0 to 11.0, wherein the proportion of the solvent A in the ink is less than 10 percent by mass.

14 Claims, 1 Drawing Sheet

(58) Field of Classification Search
USPC ............ 106/31.13, 31.27, 31.28, 31.41, 31.6
See application file for complete search history.

(56) References Cited

U.S. PATENT DOCUMENTS

| | | |
|---|---|---|
| 2012/0328854 A1 | 12/2012 | Matsuyama et al. |
| 2013/0071637 A1 | 3/2013 | Matsuyama et al. |
| 2014/0017461 A1 | 1/2014 | Matsuyama |
| 2014/0065386 A1 | 3/2014 | Matsuyama |
| 2014/0072779 A1 | 3/2014 | Matsuyama et al. |
| 2014/0092180 A1 | 4/2014 | Matsuyama et al. |
| 2015/0064418 A1 | 3/2015 | Matsuyama et al. |
| 2015/0064425 A1 | 3/2015 | Matsuyama et al. |
| 2015/0247047 A1 | 9/2015 | Matsuyama |
| 2015/0247049 A1 | 9/2015 | Matsuyama et al. |
| 2015/0252203 A1 | 9/2015 | Matsuyama et al. |
| 2015/0376425 A1 | 12/2015 | Hakiri et al. |
| 2016/0177100 A1* | 6/2016 | Mochizuki ............... C09B 57/04 428/195.1 |
| 2016/0222234 A1 | 8/2016 | Matsuyama et al. |
| 2016/0362572 A1 | 12/2016 | Matsuyama et al. |
| 2017/0174918 A1* | 6/2017 | Yanagawa ............ C09D 11/322 |
| 2017/0342286 A1 | 11/2017 | Yanagawa et al. |

FOREIGN PATENT DOCUMENTS

| | | | |
|---|---|---|---|
| JP | 2017-014150 | | 1/2017 |
| JP | 2017014150 A | * | 1/2017 |
| JP | 2018-039969 | | 3/2018 |

* cited by examiner

INK, INK CONTAINER, INKJET RECORDING DEVICE, AND RECORDING METHOD

CROSS-REFERENCE TO RELATED APPLICATIONS

This patent application is based on and claims priority pursuant to 35 U.S.C. § 119 to Japanese Patent Application Nos. 2018-022251, 2018-184958, and 2018-204019, filed on Feb. 9, 2018, Sep. 28, 2018, and Oct. 30, 2018, respectively, in the Japan Patent Office, the entire disclosures of which are hereby incorporated by reference herein.

BACKGROUND

Technical Field

The present invention relates to an ink, an ink container, an inkjet recording device, and a recording method.

Description of the Related Art

Inkjet recording methods have advantages such that the process is simple and full colorization is easy in comparison with other recording methods. Therefore, high resolution images can be obtained by a device having only a simple configuration. For this reason, the inkjet recording method is widely used from home use to office use, commercial printing, and industrial printing. In such an inkjet recording method, aqueous ink compositions using a water soluble dye as colorant are commonly used. However, its water resistance and light resistance are inferior so that pigment ink using a water insoluble pigment is under development to replace the water soluble dye.

For inkjet ink printing for office use, recording media, typically plain paper, are used and high image density is demanded. In general, when images are printed on plain paper using pigment ink, the pigment ink does not stay on the surface of the paper but permeates the paper, so that the density of the pigment on the surface decreases and consequently the image density lowers. Image density increases if pigment concentration in the ink is increased. However, the ink becomes viscous, thereby degrading the discharging stability of the ink.

In an attempt to improve the performance, a penetrant such as a hydrophobic solvent is added to ink to cause water to permeate a recording medium, which speeds up drying of the ink attached to the recording medium.

Consequently, dispersion stability is demanded in an environment where a pigment dispersion dispersed in a water solvent and ink dispersed in a hydrophobic solvent are both present.

In addition, unlike an aqueous dye ink prepared by dissolving a dye in water, the aqueous pigment ink for use in the inkjet recording method described above or pens and pencils is required to stably disperse a water-insoluble pigment in water for a long period of time. Therefore, various pigment dispersions have been developed.

A method of producing an aqueous pigment liquid dispersion has been proposed which is stably dispersed and allowed to maintain a good dispersion state for a long storage period of time. This method includes kneading a mixture of a quinacridone pigment (a), an organic polymer compound (c) having anionic group, a basic compound (d), a water-soluble organic compound (e) having a hydrogen bond parameter δh of from 7 to 13, with the hydrogen bond parameter being a solubility parameter, and a quinacridone pigment derivative (b), so as to prepare a solid pigment dispersion at normal temperature and mixing the pigment dispersion with an aqueous solvent.

Ink containing a mixture of a quinacridone compound having a specific structure has been proposed, which contributes to obtaining an aqueous ink having a good storage stability of both a pigment dispersion and ink simultaneously and an excellent discharging stability.

Ink containing a pigment, a wax, a water-soluble solvent containing a solvent having a solubility parameter (SP) value of from 9.0 to 11.0, and water, wherein the mass ratio of the content of the wax in the ink to the content of the solvent having an SP value of from 9.0 to 11.0 is in the range of from 1.0:2.5 to 1.0:25.0. It is stated in the reference that this ink has excellent storage stability and discharging stability and, with the ink, a high-saturation and high-density image having excellent abrasion resistance can be obtained.

SUMMARY

According to embodiments of the present disclosure, provided is an improved ink which comprises a pigment, a quinacridone derivative represented by the following Chemical formula 1,

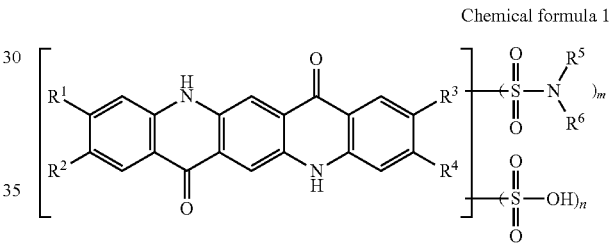

Chemical formula 1 where $R^1$, $R^2$, $R^3$, and $R^4$ each, independently represent hydrogen atoms, halogen atoms, or alkyl groups having 1 to 4 carbon atoms. $R^5$ and $R^6$ each, independently represent alkyl groups having 1 to 4 carbon atoms, and m and n each, independently represent 0, 1, or 2, excluding a case where both m and n are simultaneously 0, and a solvent A having an SP value of from 9.0 to 11.0, wherein the proportion of the solvent A in the ink is less than 10 percent by mass.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
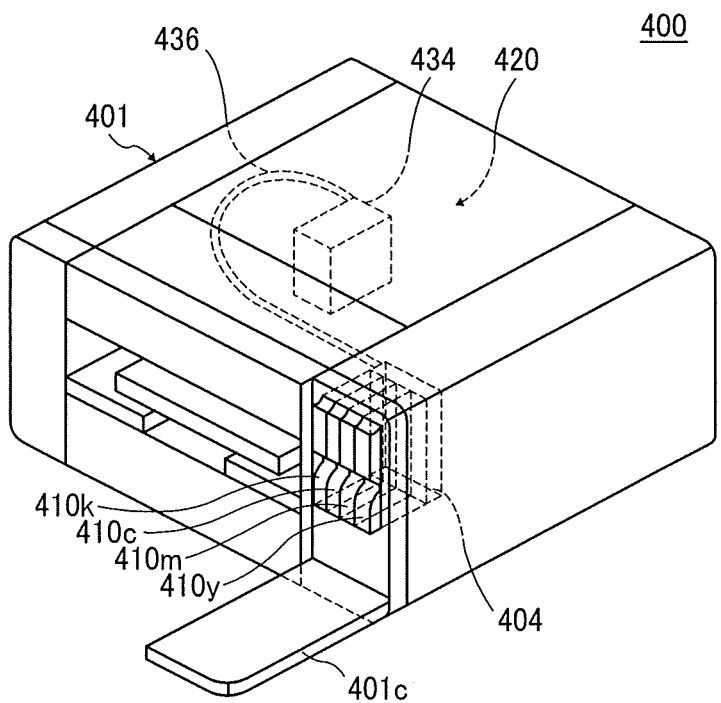
FIG. 1 is a schematic diagram illustrating a perspective view of an example of the recording device according to an embodiment of the present invention.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc. in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to the present disclosure, an ink having excellent storage property is provided with which recording is allowed with less beading.

The ink according to Embodiment 1 of the present invention comprises a pigment, a quinacridone derivative represented by the following Chemical formula, Chemical formula 1

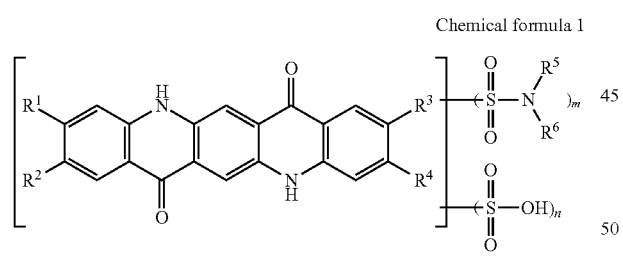

where $R^1$, $R^2$, $R^3$, and $R^4$ each, independently represent hydrogen atoms, halogen atoms, or alkyl groups having 1 to 4 carbon atoms. $R^5$ and $R^6$ each, independently represent alkyl groups having 1 to 4 carbon atoms, and m and n each, independently represent 0, 1, or 2, excluding a case where both m and n are simultaneously 0, 1 and a solvent A having an SP value of from 9.0 to 11.0, wherein the proportion of the solvent A in the ink is less than 10 percent by mass.

The ink of the present disclosure comprises a solvent (hereinafter referred to as solvent A) having an SP value of from 9.0 to 11.0.

When a solvent A having an SP value of from 9.0 to 11.0 is used as a solvent in the ink and this ink is applied to coated paper, residual solvent in the image area on the coated layer of the coated paper is reduced, thereby reducing the occurrence of beading. However, on the other hand, even for a recording medium with low water absorbency such as coated paper, the solvent A reaches the cellulose layer through the coated layer, so that it is difficult to reduce the solvent remaining in the cellulose layer by heating and drying. This solvent remaining in the cellulose layer causes a problem so-called blocking. The problem is that images are transferred to overlying sheets when primed sheets of the coated paper are stacked. In addition, the solvent A affects the storage stability of the ink dispersed using the quinacridone derivative represented by Chemical formula 1 illustrated above. When the solvent A accounts for more than 10 percent by mass of the ink, the dispersion becomes unstable. It also adversely affects discharging utilizing inkjet, which may degrade image quality such as coloring property.

Pigments are not easily dispersed and may have a storage property problem if dispersed using a resin for dispersion alone. The present inventors, however, have found that ink having good storage stability, discharging stability, and a good color-developing property can be obtained due to the dispersion caused by a combinational use of the quinacridone derivative represented by Chemical formula 1 illustrated above and a water-soluble solvent having an SP value of from 9.0 to 11.0. The present inventors have also found that good quality recording can be obtained using ink containing the water-soluble solvent having an SP value of from 9.0 to 11.0 in an amount limited to less than 10 percent by mass because beading is reduced and drying property is enhanced, thereby preventing blocking.

Based on these facts, the ink of the present disclosure has been made, and this inventive ink demonstrates excellent color-developing property, stability, and drying property even for coated paper for use in commercial printing paper.

In the following, Embodiment 1 of the present invention will be described in detail. Embodiment 1 includes the following 2 to 13 below, which is also described in detail.

2. The ink according to 1 mentioned above, wherein the proportion of the solvent A in the ink is from 2 to 8 percent by mass.
3. The ink according to 1 or 2 mentioned above, wherein the mass proportion of the quinacridone derivative to the pigment is from 0.01 to 0.1 in the ink.
4. The ink according to any one of 1 to 3 mentioned above, wherein the proportion of the quinacridone derivative in the ink is from 0.01 to 1.00 percent by mass.
5. The ink according to any one of 1 to 4 mentioned above, wherein the ratio of the quinacridone derivative to the solvent A is from 0.045 to 0.18.
6. The ink according to any one of 1 to 5 mentioned above, wherein the solvent A is at least one member selected from the group consisting of 3-ethyl-3-hydroxymethyloxetane, isopropylidene glycerol, and N,N-dimethyl-β-butoxypropionamide.
7. The ink according to any one of 1 to 6 mentioned above, wherein the pigment comprises a quinacridone pigment.
8. The ink according to any one of 1 to 7 mentioned above, wherein the pigment comprises C.I. Pigment Red 122, C.I. Pigment Violet 19, a mixed crystal of C.I. Pigment Red 122 and C.I. Pigment Violet 19, or a mixed crystal of C.I. Pigment Red 202 and C.I. Pigment Violet 19.
9. The ink according to any one of 1 to 8 mentioned above further contains a resin emulsion comprising an acrylic resin or a urethane resin.

10. The ink according to any one of 1 to 9 mentioned above further comprising a polyethylene wax.

11. The ink according to any one of 1 to 10 mentioned above further comprises a polyether-modified siloxane compound.

12. An ink container includes a container and the ink of any one of 1 to 11 mentioned above accommodated in the container.

13. An inkjet recording device includes the ink container of 12 mentioned above and a discharging device configured to discharge the ink supplied from the ink container of 12 mentioned above.

14. A recording method includes applying the ink of any one of 1 to 11 mentioned above to a recording medium.

The ink of the present disclosure contains a quinacridone derivative represented by the following Chemical formula, Chemical formula 1

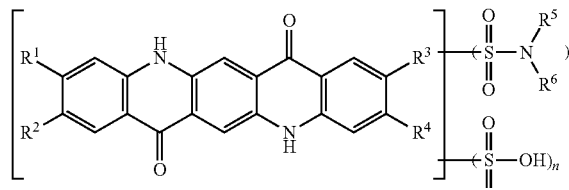

where $R^1$, $R^2$, $R^3$, and $R^4$ each, independently represent hydrogen atoms, halogen atoms, or alkyl groups having 1 to 4 carbon atoms. $R^5$ and $R^6$ each, independently represent alkyl groups having 1 to 4 carbon atoms, and m and n independently represent 0, 1, or 2, excluding a case where both m and n are simultaneously 0, 1 and a solvent A having an SP value of from 9.0 to 11.0, wherein the proportion of the solvent A in the ink is less than 10 percent by mass.

The quinacridone derivative represented by Chemical formula 1 can be obtained as a quinacridone derivative mixture through the reaction represented by the following reaction formula 1 and the reaction formula 2.

Initially, a quinacridone compound A-1 is caused to react with an excess amount of chlorosulfonic acid in the absence of any solvent and rinsed with water so as to obtain a quinacridone mixture A-2 in which a chlorosulfonic acid group and a sulfonic acid group are substituted, as represented in reaction formula 1. Next, the mixture A-2 is caused to react with dialkylamine so as to obtain a quinacridone derivative mixture A-3, as represented in reaction formula 2. The quinacridone derivative mixture as obtained through such reaction comprises a quinacridone derivative represented by Chemical formula 1, where m=1 and n=1. Quinacridone derivatives represented by Chemical formula 1, where m=1 and n=1, include derivatives in which substitution sites of a sulfonic acid group and a dialkylaminosulfonic acid group are different. Also, mixtures thereof are included.

In the present disclosure, the quinacridone derivative represented by Chemical formula 1 is allowed to be a mixture and, accordingly, a quinacridone derivative mixture obtained by the method described above is usable.

Reaction formula 1

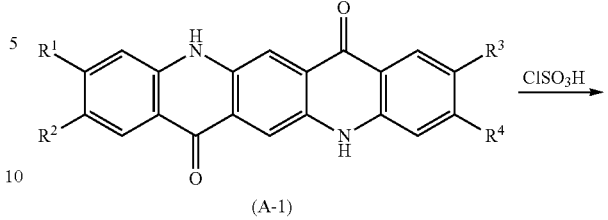

Reaction formula 2

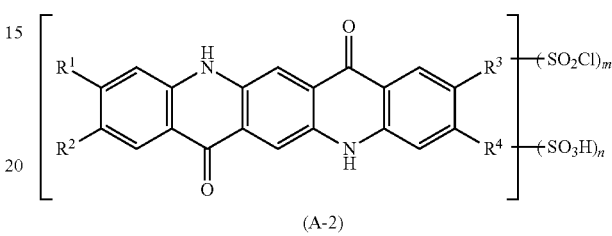

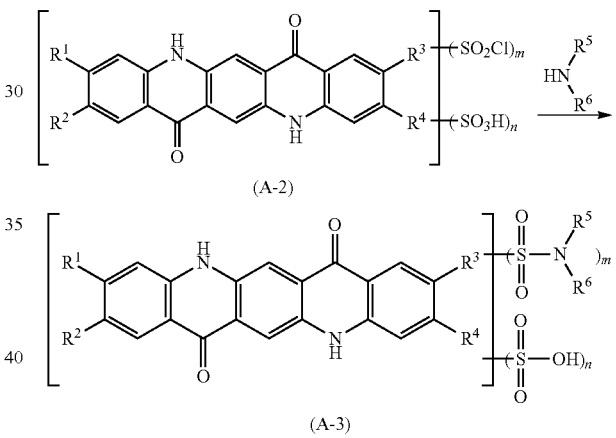

For example, it is possible to confirm that the quinacridone derivative mixture mentioned above comprises a quinacridone derivative represented by Chemical formula 1, where m=1 and n=1, by mass spectrometry.

For example, if mass spectrometry of the resultant quinacridone derivative mixture has proved that the mixture has a positive molecular ion peak at 556.1±0.1 and a negative molecular ion peak at 554.1±0.1, the quinacridone compound as represented by the upper one of the following formulae, where m=1 and n=1, is contained in the mixture, although the substitution sites are not specified. If a positive molecular ion peak is observed at 611.2 by positive ion determination, the quinacridone compound as represented by the lower one of the following formulae, where m=2 and n=0, is also contained.

In mass spectrometry, the mass accuracy and the resolution vary depending on the instrument used, and the expression "±0.1" here refers to the deviation range of mass spectrometry. A quinacridone derivative with m=1 and n=1 is assumed to be specified in the present disclosure if peak values fall within such deviation ranges.

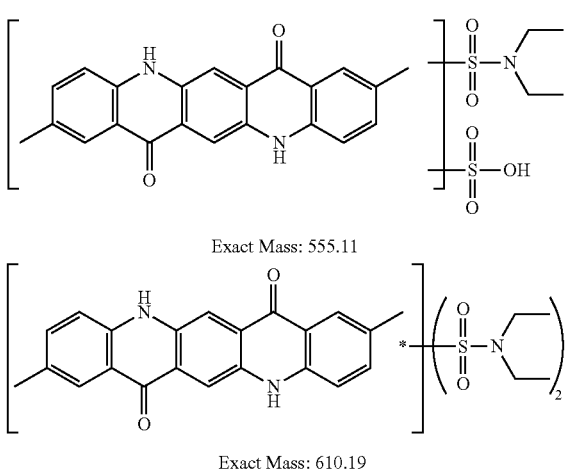

Exact Mass: 555.11

Exact Mass: 610.19

Whether or not a quinacridone derivative represented by Chemical formula 1 is contained in the ink can be determined as follows, for instance.

First of all, the ink is separated into the pigment components containing the quinacridone derivative and other components. Components dissolved in the ink are separated by centrifugal sedimentation or ultrafiltration, and components (resin for fixing and the like) dispersed in the ink and components adhering (adsorbed) to a pigment, such as a resin for dispersion, are removed using a solvent capable of dissolving these. This procedure varies depending on the materials for the ink. After the quinacridone derivative and the pigment are separated from the other components of the ink, the quinacridone derivative represented by Chemical formula 1 can be detected based on the amount of sulfur-containing functional groups that is determined by a gas chromatograph mass spectrometer (GC-MS).

Ink

The organic solvent, water, coloring material, resins, and additives for use in the ink are described below.

Coloring Material

In the present disclosure, a pigment is used as the coloring material. The pigment includes a surfactant dispersion pigment in which a pigment is dispersed with a surfactant, a resin dispersion pigment in which a pigment is dispersed with a resin, a resin coverage dispersion pigment in which the surface of a pigment is covered with a resin, a self-dispersion pigment in which a hydrophilic group is provided to the surface of a pigment, etc. Of these, water-dispersible pigments are preferable.

The ink of the present disclosure is preferably a magenta ink.

The pigment may be an azo pigment, a polycyclic pigment, a dye chelate, a nitro pigment, a nitroso pigment or the like. Of these, polycyclic pigments are preferable and particularly quinacridone pigments are preferable.

Specific examples of the pigment include, but are not limited to: C.I. Pigment Red 1, 2, 3, 5, 17, 22, 23, 31, 38, 48:2, 48:2 (Permanent Red 2B (Ca)), 48:3, 48:4, 49:1, 52:2, 53.1, 57:1 (Brilliant Carmine 6B), 60:1, 63:1, 63:2, 64:1, 81, 83, 88, 101 (Iron Oxide Red), 104, 105, 106, 108 (Cadmium Red), 112, 114, 122 (Quinacridone Magenta), 123, 146, 149, 150, 166, 168, 170, 172, 177, 178, 179, 184, 185, 190, 193, 202, 209, 219, C.I. Pigment Violet 1 (Rhodamine Lake), 3, 5:1, 16, 19, 23, and 38. Quinacridone pigments are preferable and C.I. Pigment Red 122, C.I. Pigment Violet 19, a mixed crystal of C.I. Pigment Red 122 and C.I. Pigment Violet 19, or a mixed crystal of C.I. Pigment Red 202 and C.I. Pigment Violet 19 are more preferable.

The BET specific surface area of the pigment to be used is preferably from about 10 to about 1500 $m^2/g$, more preferably from about 20 to about 600 $m^2/g$, and even more preferably from about 50 to about 300 $m^2/g$.

Unless a pigment having such a suitable specific surface area is easily available, it is possible to reduce the size of the pigment or pulverize the pigment by using, for example, a ball mill, a jet mill, or ultrasonic wave to obtain a relatively small particle diameter.

The volume particle diameter (D50) of the water-dispersible pigment is preferably from 10 to 200 nm in the ink.

The proportion of the coloring material in the ink is preferably from 0.1 to 15 percent by mass and more preferably from 1 to 10 percent by mass in terms of enhancement of image density, fixability, and discharging stability.

Dyes can be added to adjust color tone. However, it should be used within a range having no adverse impact on weather resistance.

Pigment Derivative

In order to disperse the pigment in water, a pigment derivative having a hydrophilic group attached thereto may be used. When a pigment is dispersed using a dispersant or the like, a small amount of a pigment derivative is added to the pigment and the resultant mixture is milled or kneaded to prepare a dispersion. This pigment derivative makes it possible to effectively enhance stability of a liquid dispersion with a small addition amount of the pigment derivative. An adequate adsorption power and an adequate storage stability can be obtained even if the pigment used for the liquid dispersion and the hydrophobic moiety of the pigment derivative are different from each other in structure. The pigment and the hydrophobic moiety of the pigment derivative, which are identical to each other in structure, however, allow a higher adsorption power, so that the pigment derivative adsorbing to the pigment surface is difficult to detach, which leads to a higher storage stability. In the present disclosure, the quinacridone derivative represented by Chemical formula 1 is used as a pigment derivative, whereupon the mass ratio of the quinacridone derivative to the pigment is preferably from 0.01 to 0.10 and more preferably from 0.02 to 0.08 percent by mass.

The proportion of the quinacridone derivative represented by Chemical formula 1 in the ink is preferably from 0.01 to 1.00 percent by mass. If the proportion is at least 0.01 percent by mass, adequate storage stability and discharge stability are obtained. When the proportion is 1.00 percent by mass or less, saturation of printed matter is not decreased.

The ratio of the content of the quinacridone derivative in the ink to the content of the solvent A in the ink (ratio of the quinacridone derivative/the solvent A) is preferably from 0.045 to 0.18. A ratio falling within such range secures a high storage stability.

If the ink comprises the quinacridone derivative represented by Chemical formula 1 as a quinacridone derivative mixture, the content of the quinacridone derivative represented by Chemical formula 1 refers to the total content of the quinacridone derivatives represented by Chemical formula 1, that is, the content of the mixture of the quinacridone derivatives represented by Chemical formula 1.

Pigment Dispersant

There is no specific limit to the dispersant for use in the present disclosure. Any of the dispersants for use in preparation of the liquid dispersion of a pigment can be suitably selected to suit to a particular application.

Specific examples include, but are not limited to, nonionic surfactants such as polyoxyethylene isodecyl ether, polyoxyethylene lauryl ether, polyoxyethylene-β-naphthyl ether, polyoxyethylene styryl phenyl ether and polyoxyethylene distyryl phenyl ether, and anionic surfactants, such as polyoxyethylene lauryl ether sulfate, polyoxyethylene-β-naphthyl ether sulfate, polyoxyethylene styryl phenyl ether phosphonate, polyoxyethylene distyryl phenyl carboxylate, lauryl ether phosphonate, octyl ether carboxylate, distyryl phenyl ether sulfate, styryl phenyl ether phosphonate and β-naphthyl ether carboxylate.

Copolymer

In the present disclosure, a copolymer may be used as a pigment dispersant.

As the copolymer, acrylic acid-based copolymers, vinyl-based copolymers, polyester-based copolymers, and polyurethane-based copolymers can be used. The acrylic acid-based copolymer represents copolymers using an acrylic acid derivative monomer and/or a methacrylic acid derivative monomer.

The copolymer for use in the present disclosure may have a repeating unit composed of a polymerizable monomer. It is not particularly limited and can be suitably selected to suit to a particular application. For example, the copolymer can be a polymerizable hydrophobic monomer, a polymerizable hydrophilic monomer, and a polymerizable surfactant.

The hydrophobic monomers are not particularly limited.

Specific examples include, but are not limited to, unsaturated ethylene monomers having an aromatic ring such as benzyl (meth)acrylate, styrene, α-methyl styrene, 4-t-butyl styrene, and 4-chloromethyl styrene; (meth)acrylic acid alkyl such as methyl(meth)acrylate, ethyl(meth)acrylate, n-butyl(meth)acrylate, dimethyl maleate, dimethyl itaconate, dimethyl fumarate, lauryl(meth)acrylate, tridecyl(meth)acrylate, tetradecyl(meth)acrylate, pentadecyl(meth)acrylate, hexadecyl(meth)acrylate, heptadecyl(meth)acrylate, octadecyl(meth)acrylate, nonadecyl(meth)acrylate, eicosyl (meth)acrylate, heneicosyl(meth)acrylate, and docosyl (meth)acrylate; and unsaturated ethylene monomers having an alkyl group such as 1-heptene, 3,3-dimethyl-1-pentene, 4,4-dimethyl-1-pentene, 3-methyl-1-hexene, 4-methyl-1-hexene, 5-methyl-1-hexene, 1-octene, 3,3-dimethyl-1-hexene, 3,4-diemthyl-1-hexene, 4,4-diemthyl-1-hexene, 1-nonene, 3,5,5-trimethyl-1-hexene, 1-decene, 1-undecene, 1-dodecene, 1-tridecene, 1-tetradecene, 1-pentadecene, 1-hexadecene, 1-heptadecene, 1-octadecene, 1-nonadecene, 1-eicocene, and 1-dococene. These can be used alone or in combination.

The hydrophilic monomers are not particularly limited.

Specific examples include, but are not limited to, anionic unsaturated ethylene monomers such as (meth)acrylic acid or salts thereof, maleic acid and salts thereof, monomethyl maleate, itaconic acid, monomethyl itaconate, fumaric acid, 4-styrene sulfonic acid, and 2-acrylamide-2-methyl propane sulfonic acid, 2-methacryloyloxyethylacid phosphoate, 1-methacryloyloxy ethane-1,1-diphosphonic acid; and non-ionic unsaturated ethylene monomers such as 2-hydroxyethyl (meth)acrylic acid, diethylene glycol mono(meth)acrylate, triethylene glycol(meth)acrylate, tetraethylene glycol (meth)acrylate, polyethylene glycol mono(meth)acrylate, (meth)acrylamide, N-methylol(meth)acrylamide, N-vinyl formamide, N-vinylacetoamide, N-vinylpyrolidone, acrylamide, N,N-dimethyl acrylamide, N-t-butyl acrylamide, N-octyl acrylamide, N-t-octyl acrylamide, and diacetone (meth)acrylamide. These can be used alone or in combination.

The polymerizable surfactant is, for example, an anionic or nonionic surfactant having at least one radically-polymerizable unsaturated double bond group in its molecule. Specific examples of the anionic surfactant include, but are not limited to, a hydrocarbon compound having a sulfate salt group such as ammonium sulfate group ($-SO_3-NH_4^+$) and an allyl group ($-CH_2-CH=CH_2$), a hydrocarbon compound having a sulfate group such as ammonium sulfate group ($-SO_3^+-NH_4^+$) and a methacylic group [($-CO-C(CH_3)=CH_2$], and an aromatic hydrocarbon compound having a sulfate group such as ammonium sulfate group ($-SO_3NH_4^+$) and a 1-propenyl group ($-CH=CH_2CH_3$). Specific examples include, but are not limited to, ELEMINOL JS-20 and RS-300 (both manufactured by Sanyo Chemical Industries, Ltd.) and Aqualon KH-10, Aqualon KH-1025, Aqualon KH-05, Aqualon HS-10, Aqualon HS-1025, Aqualon BC-0515, Aqualon BC-10, Aqualon BC-1025, Aqualon BC-20, and Aqualon BC-2020 (all manufactured by DKS Co. Ltd.).

The nonionic surfactant is, for example, a hydrocarbon compound or an aromatic hydrocarbon compound having 1-propenyl group ($-CH=CH_2CH_3$) and a polyoxyethylene group [$-(C_2H_4O)_n-H$].

Specific examples include, but are not limited to, Aqualon RN-20, Aqualon RN-2025, Aqualon RN-30, and Aqualon RN-50 (all manufactured by DKS Co. Ltd.) and LATEMUL PD-104, LATEMUL PD-420, LATEMUL PD-430, and LATEMUL PD-450 (all manufactured by Kao Corporation).

The copolymer is obtained through reaction of a monomer component with a solvent placed in a flask equipped with a stirrer, a thermometer, and a nitrogen gas introducing tube under the presence of a polymerization initiator in nitrogen gas reflux at about 50 degrees C. to about 150 degrees C. The viscosity of the aqueous solution or a water liquid dispersion of the synthesized copolymer is adjusted by changing the molecular weight thereof. Specifically, it can be changed by changing the monomer concentration, the amount of a polymerization initiator, polymerization temperatures, and polymerization time during polymerization.

With regard to the polymerization temperature, a polymer having a low molecular weight is easily obtained by polymerization at high temperatures for a short period of time. By contrast, a copolymer having a high molecular weight tends to be obtained by polymerization at low temperatures for a long period of time. With regard to the amount of a polymerization initiator, if a large amount thereof is used, a copolymer having a low molecular weight tends to be obtained. If the amount is small, a copolymer having a high molecular weight tends to be obtained. With regard to the monomer concentration during polymerization reaction, if the concentration is high, a copolymer having a low molecular weight tends to be obtained. If the concentration is low, a copolymer having a high molecular weight tends to be obtained. The weight average molecular weight of the copolymer is not particularly limited and can be suitably selected to suit to a particular application. It is preferably from 3,000 to 60,000, more preferably from 4,000 to 50,000, and furthermore preferably from 5,000 to 30,000. When the weight average molecular weight is within the preferable range and the copolymer is used for an ink for inkjet recording, the dispersion stability and discharging stability of the ink are improved.

The weight average molecular weight can be measured by, for example, gel permeation chromatography (GPC).

Organic Solvent

There is no specific limitation to the organic solvent for use in the present disclosure. For example, water-soluble organic solvents can be used. Examples are polyols, ethers such as polyol alkylethers and polyol arylethers, nitrogen-containing heterocyclic compounds, amides, amines, and sulfur-containing compounds.

Specific examples of the polyol include, but are not limited to, ethylene glycol, diethylene glycol, 1,2-propanediol, 1,3-propane diol, 1,2-butanediol, 1,3-butanediol, 1,4-butanediol, 2,3-butanediol, 3-methyl, 1,3-butanediol, trethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and petriol.

Specific examples of the polyol alkyl ethers include, but are not limited to, ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Specific examples of the polyol aryl ethers include, but are not limited to, ethylene glycol monophenyl ether and ethylene glycol monobenzyl ether.

Specific examples of nitrogen-containing heterocyclic compounds include, but are not limited to, 2-pyrolidone, N-methyl-2-pyrolidone, N-hydroxyethyl-2-pyrolidone, 1,3-dimethyl-2-imidazoline, ε-caprolactam, and γ-butylolactone.

Specific examples of the amide include, but are not limited to, formamide, N-methyl formamide, N,N-dimethylformamide, 3-methoxy-N,N-dimethyl propionamide, and 3-butoxy-N,N-dimethylpropionamide.

Specific examples of the amine include, but are not limited to, monoethanol amine, diethanol amine, and triethyl amine.

Specific examples of the sulfur-containing compounds include, but are not limited to, dimethyl sulphoxide, sulfolane, and thiodiethanol.

Also, for example, propylene carbonate, ethylene carbonate, etc. can be used as the organic solvent.

To serve as a humectant and impart a good drying property, it is preferable to use an organic solvent having a boiling point of 250 degrees C. or lower.

Polyol compounds having eight or more carbon atoms and glycol ether compounds are also suitable as the organic solvent.

Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyol alkylethers such as ethyleneglycol monoethylether, ethyleneglycol monobutylether, diethyleneglycol monomethylether, diethyleneglycol monoethylether, diethyleneglycol monobutylether, tetraethyleneglycol monomethylether, and propyleneglycol monoethylether; and polyol arylethers such as ethyleneglycol monophenylether and ethyleneglycol monobenzyl ether.

The polyol compounds having eight or more carbon atoms and glycolether compounds enhance permeability of ink for paper used as a recording medium.

The proportion of the organic solvent in the ink has no particular limit and can be suitably selected to suit to a particular application.

In terms of drying property and discharging reliability of ink, the proportion is preferably from 10 to 60 percent by mass and more preferably from 20 to 60 percent by mass.

The ink of the present disclosure includes at least one kind of the solvent A having a solubility parameter (SP) value of from 9.0 to 11.0. Inclusion of the organic solvent X improves wettability of the ink to a recording medium so that the ink components permeates into commercial printing paper such as coated paper having a coated layer with poor ink absorption property. Therefore, occurrence of beading is suppressed.

The SP value means a dissolution parameter and is used in general as an index for affinity and solubility of materials such as a solvent, a resin, and a pigment dissolved or dispersed in water or a solvent for use. The SP value can be obtained by various ways such as measuring by experiments, calculating by measuring physical property such as immersion heat, or calculating from molecular structures. In the present disclosure, the SP value is obtained by the calculation method based on the molecule structure proposed by Fedors. This method has advantages that the SP value can be calculated if a molecule structure is known and the difference between the SP value obtained from this method and the measuring value based on experiments is small. In the Method of Fedors, the evaporation energy $\Delta e_i$ and the mol volume $\Delta v_i$ of each atom and atom group at 25 degrees C. are defined as in the following Table 1 and the values are assigned to the following Equation 1 to obtain the SP value. Also, in the present disclosure, the SP value at 25 degrees C. is used and not subject to temperature conversion, etc.

$$SP \text{ value} = \left(\frac{\Delta E}{V}\right)^{1/2} = \left(\frac{\sum_i \Delta e_i}{\sum_i \Delta v_i}\right)^{1/2} \quad \text{Equation 1}$$

In Equation 1, $\Delta E$ represents agglomeration energy density, V represents mol volume, $\Delta e_i$ represent the evaporation energy of atom or atom group, and $\Delta v_i$ represents mol volume of atom or atom group.

For example, the SP value of isopropylidene glycerol (iPDG) is calculated based on the values shown in Table 1 as follows:

SP value=$(14150/139.8)^{1/2}$=10.1$(cal/cm^3)^{1/2}$

TABLE 1

| | | | iPDG | | |
|---|---|---|---|---|---|
| Atomic group | $\Delta e_i$ cal/mol | $\Delta v_i$ cm$^3$/mol | Number of atomic groups | Sum of $\Delta e_i$ cal/mol | Sum of $\Delta v_i$ cm$^3$/mol |
| —CH$_3$ | 1125 | 33.5 | 2 | 2250 | 67.0 |
| —CH$_2$— | 1180 | 16.1 | 2 | 2360 | 32.2 |
| —CH= | 1030 | 13.5 | 1 | 1030 | 13.5 |
| —C= | 1690 | 6.5 | 1 | 1690 | 6.5 |
| —O— | 800 | 3.8 | 2 | 1600 | 7.6 |
| —OH (adjacent to carbon atom) | 5220 | 13.0 | 1 | 5220 | 13.0 |
| | | | Total | 14150 | 139.8 |

As the solvent A, water-soluble solvents are preferable. 3-ethyl-3-hydroxymethyloxetane (SP value of 10.7), isopropylidene glycerol (SP value of 9.8), and N,N-dimethyl-β-butoxypropionamide (SP value of 9.0) are particularly preferable. The solvents specified above have excellent drying property.

Organic solvents having an SP value of less than 0.9 are little dissolved in water and, accordingly, tend to cause separation. Organic solvents having an SP value of more than 11.0 tend to have poor drying property and accelerate beading. Consequently, it is not possible to compose the ink by such solvents alone as an ink component so that it is necessary to use it with the solvent A having an SP value of from 9.0 to 11.0.

The proportion of the solvent A having an SP value of from 9.0 to 11.0 to the ink is less than 10 percent by mass and preferably from 2 to 8 percent by mass. If the proportion is 2 percent by mass or more, the occurrence of beading can be further reduced. If the proportion is less than 10 percent by mass, the discharging stability of the ink is not degraded due to an increase of viscosity, and the proportion is more preferably 8 percent by mass or less.

Use of a gas chromatograph mass spectrometer (GC-MS) makes it possible to quantify organic compounds containing solvents. Therefore, the content of the solvent A in the ink can be determined.

Water

The proportion of water in the ink is not particularly limited and can be suitably selected to suit to a particular application. For example, in terms of the drying property and discharging reliability of the ink, the proportion is preferably from 10 to 90 percent by mass and more preferably from 20 to 60 percent by mass.

Resin Emulsion

A resin emulsion having excellent film-forming (image forming) property, water repellency, water-resistance, and weather resistance is suitable for good water-resistant image recording with high image density (high coloring property). For example, condensation-based synthetic resins, addition-based synthetic resins, and natural polymers are suitable.

Specific examples of the condensation-based synthetic resins include, but are not limited to, polyester resins, polyurethane resins, polyepoxy resins, polyamide resins, polyether resins, poly(meth)acrylic resins, acrylic-silicone resins, and fluorochemical resins. Specific examples of the addition-based synthetic resins include, but are not limited to, polyolefin resins, polystyrene-based resins, polyvinyl alcohol-based resins, polyvinyl ester-based resins, polyacrylic acid-based resins, and unsaturated carboxylic acid-based resins.

Specific examples of the natural polymer include, but are not limited to, celluloses, rosins, and natural rubber. As the resin emulsion, self-dispersible resins having a hydrophilic group or resins themselves having no dispersibility while dispersibility is imparted by a surfactant or a resin having a hydrophilic group are suitable. Of these, polyacrylic resins or polyurethane resins are preferable. Mixtures of the resin emulsion is also usable.

In the case of emulsification polymerization of an unsaturated monomer, since an unsaturated monomer, a polymerization initiator, a surfactant, a chain transfer agent, a chelate agent, a pH regulator, etc. are added in water to conduct reaction to obtain a resin emulsion, it is easy to obtain a water-dispersible resin and change the resin components. Therefore, a water-dispersible resin having target properties is easily obtained.

Since dispersion breakage or cleavage of molecular chains ascribable to hydrolysis, etc. of the resin emulsion is caused in a strong alkali or strong acid environment, pH is preferably from 4 to 12. It is more preferably from 6 to 11 and particularly preferably from 7 to 10 in terms of the miscibility with a water-dispersible colorant.

The average particle diameter (D50) of the resin emulsion is related to viscosity of the liquid dispersion. If the compositions are the same, viscosity of the same solid portion increases as the particle diameter decreases. To avoid preparing ink having an excessively high viscosity, the average particle diameter (D50) of the hydrodispersible resin is preferably 50 nm or more. In addition, particles having a particle diameter as large as several tens μm are larger than the size of the nozzle orifice of an inkjet head. Therefore, particles of that size is not suitable for use. When particles are smaller than the nozzle orifice but large particles are still present in ink, the discharging performance of the ink deteriorates. The average particle diameter (D50) is preferably 200 nm or less and more preferably 150 nm or less not to degrade the ink discharging property.

In addition, the resin emulsion fixes the water-dispersible colorant on paper and forms a film at room temperature to improve the fixability of the colorant. Therefore, the minimum film-forming temperature (MFT) of the resin emulsion is preferably 30 degrees C. or lower. In addition, when the glass transition temperature of the resin emulsion is −40 degrees C. or lower, viscosity of the resin film increases, thereby increasing tackiness of printed matter. Therefore, the glass transition temperature is preferably −30 degrees C. or higher.

The proportion of the resin emulsion in the ink is preferably from 0.5 to 10 percent by mass and more preferably from 1 to 8 percent by mass.

Wax

The ink of the present disclosure may contain wax. The wax can be water-soluble or water-dispersible. A wax having a hydrophilic group, such as a hydroxy group, a carboxy group, an ethylene oxide group, and an amino group, may be used as the water-soluble wax, and the water-dispersible wax may be used in the form of wax emulsion.

Specific examples thereof include, but are not limited to, plant waxes or animal waxes such as carnauba wax, candelilla wax, bees wax, rice wax, and laonlin, oil waxes such as paraffin wax, microcrystalline wax, polyethylene wax, polypropylene wax, polyethylene oxide wax, and petrolatum, mineral waxes such as montan wax and ozocerite, synthetic waxes such as carbon wax, hechist wax, polyethylene wax, and stearic acid amide, natural-synthetic wax emulsion of copolymers of a olefin and maleic anhydride, etc., or blending waxes. These can be used alone or in combination. In addition, latex, colloid solutions, suspension liquids can be used. In the present disclosure, polyethylene wax is preferable in terms of solubility and dispersibility in the water soluble solvents.

These waxes are also available on the market.

Specific examples include, but are not limited to, Selosol 524 (carnauba wax, melting point: 83 degrees C., particle diameter: 200 nm, manufactured by CHUKYO YUSHI CO., LTD.), HYTEC-E-6500 (polyethylene wax, melting point: 140 degrees C., particle diameter: 60 nm, manufactured by TOHO Chemical Industry Co., Ltd.), HYTEC E-8237 (polyethylene wax, melting point: 106 degrees C., particle diameter: 80 nm, manufactured by TOHO Chemical Industry Co., Ltd.), HYTEC P-9018 (polypropylene wax, melting point: 156 degrees C., particle diameter: 60 nm, manufactured by TOHO Chemical Industry Co., Ltd.), Nopcoat PEM-177 (polyolefin wax, melting point: 105 degrees C., particle diameter: 10 nm, manufactured by SAN NOPCO LIMITED), AQUACER 498 (paraffin-based wax, melting point: 58 degrees C., manufactured by Byc Chemie Japan), AQUACER 535 (mixing-based wax, melting point: 95 degrees C., manufactured by Bye Chemie Japan), AQUACER 531 (polyethylne wax, melting point: 130 degrees C., particle diameter: 123 nm, manufactured by Byc Chemie Japan), and AQUACER 515 (polyethylne wax, melting point: 135 degrees C., particle diameter: 33 nm, manufactured by Byc Chemie Japan).

The melting point of the wax is preferably from 70 to 170 degrees C. and more preferably from 100 to 140 degrees C. When the melting point is 70 degrees C. or higher, obtained images are not sticky, so that image transfer does not occur when the images are overlapped. When the melting point is 170 degrees C. or lower, the wax melts by friction heat when obtained images are abraded. That is, slippage is obtained, thereby improving abrasion durability of the images.

The volume average particle diameter of the wax is preferably 200 nm or less and more preferably from 20 to 150 nm. When the volume average particle diameter is 200 nm or less, the wax does not stack in a nozzle or a filter in a head so that good dischargeability is obtained.

The proportion of the wax in a solid form to the ink is preferably from 0.05 to 2 percent by mass and more preferably from 0.1 to 0.5 percent by mass. When the proportion of the wax is 0.1 percent by mass or greater, slippage is imparted to the surface of a printed image so that abrasion resistance thereof can be maintained high. In addition, when the proportion is 0.5 percent by mass or less, the wax can be dissolved or dispersed in a solvent in the ink so that the wax does not adhere to a head, which makes it possible to discharge ink droplets well.

Surfactant

Examples of the surfactant are silicone-based surfactants, fluorochemical surfactants, amphoteric surfactants, nonionic surfactants, anionic surfactants, etc.

The surfactants are classified into anionic surfactants, nonionic surfactants, and ampholytic surfactants by hydrophilic group or fluorine-based surfactants, acetylene-based surfactants, etc. by hydrophobic group.

Specific examples of the anionic surfactants include, but are not limited to, polyoxyethylene alkyl ether acetates, dodecyl benzene sulfonates, laurates, and polyoxyethylene alkyl ether sulfates.

Specific examples of the nonionic surfactants include, but are not limited to, polyols, glycol ethers, polyoxyethylene alkyl ethers, polyoxyethylene alkyl esters, polyoxy ethylene sorbitan aliphatic esters, polyoxyethylene alkyl phenyl ethers, polyoxyethylene alkyl amines, polyoxyethylene alkyl amides, and acetylene glycol.

The silicone-based surfactant has no specific limit and can be suitably selected to suit to a particular application.

Of these, preferred are silicone-based surfactants which are not decomposed even in a high pH environment.

Specific examples include, but are not limited to, side-chain-modified polydimethylsiloxane, both-distal-end-modified polydimethylsiloxane, one-distal-end-modified polydimethylsiloxane, and side-chain-both-distal-end-modified polydimethylsiloxane. A silicone-based surfactant having a polyoxyethylene group or a polyoxypropylene group as a modification group is particularly preferable because such an agent demonstrates good properties as an aqueous surfactant. It is possible to use a polyether-modified silicone-based surfactant as the silicone-based surfactant. A specific example is a compound in which a polyalkylene oxide structure is introduced into the side chain of the Si site of dimethyl siloxane.

Specific examples of the fluorochemical surfactants include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactants do not easily produce foams.

Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carboxylic acid compounds include, but are not limited to, perfluoroalkyl carboxylic acid and salts of perfluoroalkyl carboxylic acid.

Specific examples of the polyoxyalkylene ether polymer compounds having a perfluoroalkyl ether group in its side chain include, but are not limited to, salts of sulfuric acid ester of polyoxyalkylene ether polymer having a perfluoroalkyl ether group in its side chain and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

Polyether-Modified Siloxane Copolymer

As a material of the ink for use in the present disclosure, a polyether-modified siloxane compound can also be used as a surfactant.

This makes ink not easy to be wet on a head nozzle plate ink repelling layer. Therefore, defective discharging caused by ink attachment to a nozzle can be prevented and discharging stability is improved. In addition, ink is not easily attached to the surface of a nozzle ink repelling layer which tends to create a problem. The ink is free of defective discharging. Of these, it is preferable to select surfactants represented by Chemical formula 2. In particular, surfactants having a low dynamic surface tension, a high permeability, and an excellent leveling property without degrading dispersion stability irrespective of the kind of the water-dispersible coloring material and the combinational use of the organic solvents. These polyether-modified siloxane compounds can be used alone or in combination.

Chemical formula 2

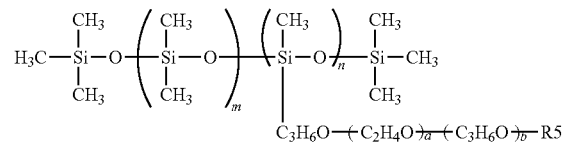

In Chemical formula 2, R5 represents a hydrogen atom or an alkyl group having 1 to 4 carbon atoms, "m" represents 0 or an integer of from 1 to 23, "n" represents an integer of from 1 to 10, "a" represents an integer of from 1 to 23, and "b" represents 0 or an integer of from 1 to 23.

Examples of the compounds represented by Chemical formula 2 include, but are not limited to, the compounds of the following Chemical formulae 2-1 to 2-3.

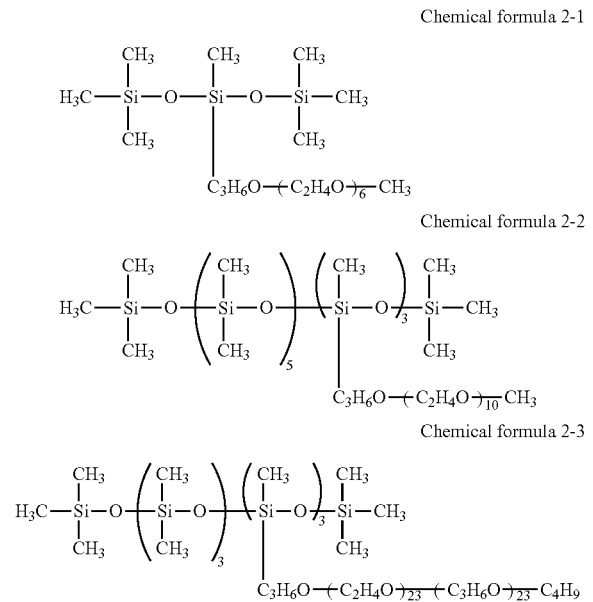

Furthermore, specific examples of polyether-modified siloxane compound surfactants available on the market demonstrating the same feature as the above-mentioned compounds include, but are not limited to, 71ADDITIVE, 74ADDITIVE, 57ADDITIVE, 8029ADDITIVE, 8054ADDITIVE, 8211ADDITIVE, 8019ADDITIVE, 8526ADDITIVE, and FZ-2123, FZ-2191, all manufactured by Dow Corning Toray Co., Ltd., TSF4440, TSF4441, TSF4445, TSF4446, TSF4450, TSF4452, and TSF4460, all manufactured by Momentive Performance Materials Inc., SILFACE SAG002, SILFACE SAGOO03, SILFACE SAGO05, SILFACE SAG503A, SILFACE SAG008, and SILFACE SJM0063, all manufactured by Nisshin Chemical Co., Ltd., TEGO_Wet_KL245, TEGO_Wet_250, TEGOWet 260, TEGO_Wet_265, TEGO_Wet_270, and TEGO_Wet_280, all manufactured by Evonik Industries AG, and BYK-345, BYK-347, BYK-348, BYK-375, and BYK-377, all manufactured by BYK Japan KK.

In addition, the polyether-modified siloxane compound surfactant, fluorochemical surfactants, silicone-based surfactants, acetyleneglycol-based or acetylenealcohol-based surfactants can be used in combination.

The proportion of the surfactant in the ink is preferably from 0.001 to 5 percent by mass and more preferably from 0.5 to 3 percent by mass. When the proportion is 0.001 percent by mass or more, the addition of a surfactant has a good impact. However, when the proportion is not less than 5 percent by mass, the addition impact is saturated, meaning that increasing the proportion furthermore is meaningless.

Other Components

The ink of the present invention may optionally furthermore contain known additives in addition to the components mentioned above. Examples thereof are penetrants, foam inhibitors (defoaming agents), pH regulators, preservatives and fungicides, chelate reagents, corrosion inhibitors, antioxidants, ultraviolet absorbents, oxygen absorbents, and photostabilizing agents.

Penetrant (Permeating Agent)

The penetrant preferably includes at least one kind of non-wetting agent type polyol compounds or glycol ether compounds having 8 to 11 carbon atoms. "Non-wetting agent type" means solubility of from 0.2 to 5.0 percent by mass in water at 25 degrees C. Of these penetrants, 1,3-diol compounds represented by the following Chemical formula 3 is preferable. 2-ethyl-1,3-hexane diol (solubility of 4.2 percent at 25 degrees C.) and 2,2,4-trimethyl-1,3-pentane diol (solubility of 2.0 percent at 25 degrees C.) are particularly preferable.

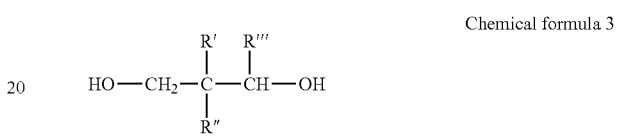

In Chemical formula 3, R' represents a methyl group or an ethyl group, R'' represents a hydrogen or a methyl group, and R''' represents an ethyl group or a propyl group.

Specific examples of the other non-wetting agent type polyol compounds include, but are not limited to, aliphatic diols such as 2-ethyl-2-methyl-1,3-propanediol, 3,3-dimethyl-1,2-butane diol, 2,2-diethyl-1,3-propane diol, 2-methyl-2-propyl-1,3-propane diol, 2,4-dimethyl-2,4-pentane diol, 2,5-dimethyl-2,5-hexane diol, and 5-hexene-1,2-diol.

The proportion of the penetrant in the ink is preferably from 0.5 to 4 percent by mass and more preferably from 1 to 3 percent by mass. When the proportion is not less than 0.5 percent by mass, permeation effect of the ink is easily obtained and image quality is improved. In addition, if the proportion is not greater than 4 percent by mass, the ink is sufficiently dissolved so that no separation occurs and the initial viscosity of the ink is not high.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable in terms of the effect of foam breaking.

pH Regulator

The pH regulator has no particular limit as long as it can control pH to not lower than 7. Specific examples include, but are not limited to, amines such as diethanol amine and triethanol amine.

Preservatives and Fungicides

The preservatives and fungicides are not particularly limited. A specific example is 1,2-benzisothiazoline-3-one.

Chelate Reagent

Specific examples of the chelate reagents include, but are not limited to, ethylene diamine sodium tetraacetate, nitrilo sodium triacetate, hydroxyethyl ethylene diamine sodium tri-acetate, diethylene triamine sodium quinternary acetate, and uramil sodium diacetate.

Corrosion Inhibitor

The corrosion inhibitor has no particular limitation. Specific examples include, but are not limited to, acid sulfites and sodium thiosulfates.

Anti-Oxidant

Specific examples of the anti-oxidants include, but are not limited to, phenol-based anti-oxidants (including hindered phenol-based anti-oxidants), amino-based anti-oxidants, sulfur-based anti-oxidants, and phosphorous-based anti-oxidants.

Ultraviolet Absorbent

Specific examples of the ultraviolet absorbent include, but are not limited to, a benzophenone-based ultraviolet absorbent, a benzotriazole-based ultraviolet absorbent, a salicylate-based ultraviolet absorbent, a cyanoacrylate-based ultraviolet absorbent, and a nickel complex salt-based ultraviolet absorbent.

Manufacturing of Ink

The ink of the present disclosure is manufactured by dispersing or dissolving a pigment, the quinacridone compound, an organic solvent, water, and other optional components in an aqueous medium followed by stirring and mixing, if desired. For dispersion or dissolution, a sand mill, a homogenizer, a ball mill, a paint shaker, an ultrasonic dispersing agent, etc. can be used. For stirring and mixing, a stirrer having a typical stirring wing, a magnetic stirrer, a high speed dispersing device, etc.

Ink Properties

There is no specific limitation to ink properties, which can be suitably selected to suit to a particular application.

However, when the static surface tension of ink is not less than 20 mN/m and the dynamic surface tension thereof is 34 mN/m or less at a bubble life time of 15 msec as measured by maximum bubble pressure technique, wettability to a recording medium is sufficiently secured. In addition, the ink is not wettable to the nozzle blade of tool repelling film of an inkjet head and discharging stability can be secured so that the ink is extremely stable.

Viscosity of the liquid composition at 25 degrees C. is preferably from 5 to 25 mPa·s and more preferably from 6 to 20 mPa·s. When the ink viscosity is 5 mPa·s or greater, the printing density and the text quality of the ink are improved. When the ink viscosity is 25 mPa·S or less, a suitable ink discharging property is secured.

The viscosity can be measured by, for example, a viscometer (RE-550L, manufactured by TOKI SANGYO CO., LTD.) at 25 degree C.

The ink of the present disclosure is used in any printer having an inkjet head such as a piezoelectric element type in which ink droplets are discharged by transforming a diaphragm forming the wall of the ink flow path using a piezoelectric element as a pressure generating device to press the ink in the ink flow path; a thermal type in which bubbles are produced by heating ink in the ink flow path with a heat element; and an electrostatic type in which ink droplets are discharged by volume changes in the ink flow path caused by transforming a diaphragm that forms the wall surface of the ink flow path by an electrostatic force generated between the diaphragm and the electrode while the diaphragm and the electrode are provided facing each other.

The ink of the present disclosure can be accommodated in a container such as an ink cartridge for use.

Ink Container

The ink container of the present disclosure accommodates the ink of the present disclosure in a container and includes other optional suitably-selected members.

There is no specific limit to the container. It is possible to select any form, any structure, any size, and any material to suit to a particular application. For example, the container including at least an ink accommodating unit made of aluminum laminate film, plastic film, etc. can be suitably used.

Recording Medium

There is no specific limitation to the recording medium on which recording is possible using the ink of the present disclosure. The recording medium can be suitably selected to suit to a particular application. For example, plain paper, gloss paper, special paper, cloth, film, transparent sheets, print sheet for general purpose, etc. are suitable. However, the ink of the present disclosure is excellent in terms that quality recording with this ink is possible on commercial printing paper as well as other kinds of paper.

The commercial printing paper has a coated layer on at least one side of the substrate of the printing paper. An example thereof is printing paper using a filler such as calcium carbonate and kaolin as the material for the coated layer, Coated printing paper as an example of the commercial printing paper has a coated layer formed of white pigment such as clay (kaolin) or calcium carbonate and an adhesive (binder) such as starch.

Recorded matter having an image formed using the ink of the present disclosure is high quality, free of image blur and has excellent stability over time so that it can be suitably used as references for various purposes, on which texts, images, etc. are recorded.

Of these, a recording medium having a liquid imbibition in a particular range is suitable in terms of recording images having good image quality (image density, saturation, beading, color bleed) and high gloss with excellent smear fixability. Specifically, commercial printing paper having a coated layer on at least one side of the substrate is good. It is preferable that such paper have a transfer amount of pure water to the side of the coated layer of from 2 to 35 mL/m$^2$ in a contact time of 100 ms and from 3 to 40 ml/m$^2$ in a contact time of 400 ms as measured by a dynamic scanning absorptometer. If the transfer amount of pure water is excessively small in comparison with those ranges, beading (a phenomenon in which adjacent dots attracted to each other make images look rough) and color bleed (bleed between colors) tend to occur even if the ink mentioned above is used. When a recording medium having an excessively large transfer amount of pure water is used, the ink dot diameter after recording tends to become smaller than desired, so that solid images may not be filled with the ink.

The transfer amount of pure water can be measured by a dynamic scanning absorptometer (K350 Series D type, manufactured by KYOWA SEIKO INC.). Each of the transfer amount in the contact time of 100 ms can be obtained by interpolation of the measuring results of the transfer amount in the proximity contact time of the respective contact periods of time.

Printing paper having a liquid imbibition in the particular range is available on the market.

Specific examples include, but are not limited to, POD GLOSS COAT, OK TOP COAT+, OK KINFUJI+, and SA KINFUJI+ (manufactured by Oji Paper Co., Ltd.), SUPER MI DUL, AURORA COAT, and SPACE DX (manufactured by Nippon Paper Industries Co., Ltd.), α matte and μ coat (manufactured by Hoketsu Paper Co., Ltd.), RAICHO ART and RAICHO SUPER ART (manufactured by Chuetsu Pulp & Paper Co., Ltd.), and PEARL COAT N (manufactured by Mitsubishi Paper Mills Limited).

Recording Device and Recording Method

The ink of the present disclosure can be suitably applied to various recording devices employing an inkjet recording method, such as printers, facsimile machines, photocopiers, multifunction peripherals (serving as a printer, a facsimile machine, and a photocopier), and solid freeform fabrication devices (3D printers, additive manufacturing devices).

In the present disclosure, the recording device and the recording method respectively represent a device capable of discharging ink, various processing liquids, etc. to a recording medium and a method of recording utilizing the device. The recording medium means an article to which ink or various processing fluids can be temporarily or permanently attached.

The recording device may further optionally include a device relating to feeding, conveying, and ejecting a recording medium and other devices referred to as a pre-processing device, a post-processing device, etc. in addition to the head portion to discharge the ink.

The recording device and the recording method may further optionally include a heating device (heater) for use in the heating process and a drying device (drier) for use in the drying process. For example, the heating device and the drying device heat and dry the print surface and the opposite surface of a recording medium. The heating device and the drying device are not particularly limited. For example, a fan heater and an infra-red heater can be used. Heating and drying can be conducted before, in the middle of, or after printing.

In addition, the recording device and the recording method are not limited to those producing meaningful visible images such as texts and figures with ink. For example, the recording method and the recording device capable of producing patterns like geometric design and 3D images are included.

In addition, the recording device includes both a serial type device in which the discharging head is allowed to move and a line type device in which the liquid discharging head is not moved, unless otherwise specified.

Furthermore, in addition to the desktop type, this recording device includes a device capable of printing images on a wide recording medium such as AO and a continuous printer capable of using continuous paper rolled up in a roll-like form as a recording medium.

Figure 2:
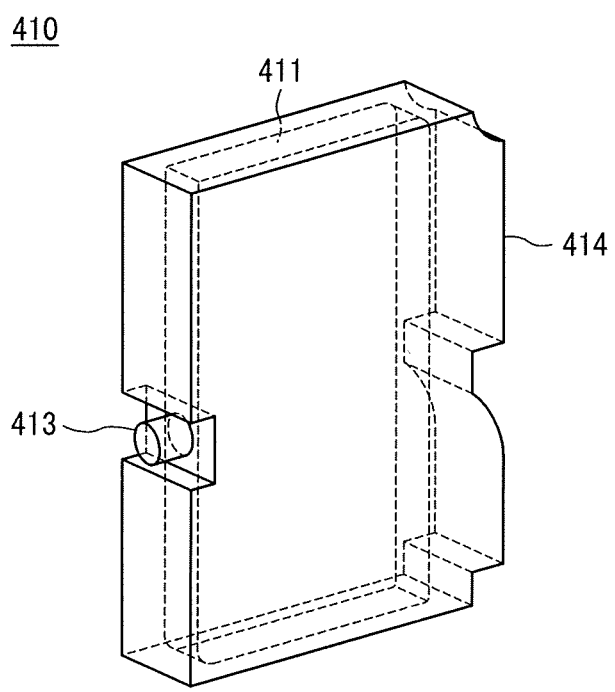
FIG. 2 is a schematic diagram illustrating a perspective view of an example of the ink container according to an embodiment of the present invention.

The recording device is described using an example with reference to FIG. 1 and FIG. 2. FIG. 1 is a diagram illustrating a perspective view of the recording device. FIG. 2 is a diagram illustrating a perspective view of the main tank. An image forming device 400 as an embodiment of the recording device is a serial type image forming device. A mechanical assembly 420 is disposed in an exterior 401 of the image forming device 400. Each ink accommodating unit 411 of each main tank 410 (410$k$, 410$c$, 410$m$, and 410$y$) for each color of black (K), cyan (C), magenta (M), and yellow (Y) is made of, for example, a packaging member such as aluminum laminate film. The ink accommodating unit 411 is housed in, for example, a plastic container housing unit 414. As a result, the main tank 410 is used as an ink cartridge of each color.

A cartridge holder 404 is disposed on the rear side of the opening appearing when a cover 401$c$ is opened. The main tank 410 is detachably attached to the cartridge holder 404. This enables each ink outlet 413 of the main tank 410 to communicate with a discharging head 434 for each color via a supplying tube 436 for each color so as to discharge the ink from a discharging head 434 to a recording medium.

This recording device may include not only a portion to discharge ink but also devices referred to as a pre-processing device, a post-processing device, etc.

As an example of the pre-processing device and the post-processing device, as in the case of the ink such as black (K), cyan (C), magenta (M), and yellow (Y), the pre-processing device and the post-processing device may further include a liquid accommodating unit including a pre-processing fluid or a post-processing fluid and a liquid discharging head to discharge the pre-processing fluid or the post-processing fluid according to an inkjet printing method.

As another example of the pre-processing device and the post-processing device, it is suitable to dispose a pre-processing device and a post-processing device which do not employ the inkjet printing method but a blade coating method, a roll coating method, or a spray coating method.

Recorded Matter

The ink recorded matter of the present disclosure includes a recording medium and an image formed on the recording medium with the ink of the present disclosure.

The recorded matter is obtained by an inkjet recording device executing an inkjet recording method.

The usage of the ink of the present disclosure is not particularly limited and can be suitably selected to suit to a particular application. For example, the ink can be used for printed matter, a paint, a coating material, and foundation. The ink can be used to form two-dimensional texts and images and furthermore a three-dimensional solid object (solid freeform fabrication object) as a material for 3D modeling.

The solid fabrication apparatus to fabricate a solid fabrication object can be any known device with no particular limit. For example, the apparatus includes a container, a supplying device, and a discharging device, a drier, etc. of ink. The solid fabrication object includes an object manufactured by repeated ink coating. In addition, the solid fabrication object includes a molded processed product manufactured by processing a structure having a substrate such as a recording medium to which the ink is applied. The molded processed product is manufactured from recorded matter or a structure having a sheet-like form, film-like form, etc. by, for example, heating drawing or punching. The molded processed product is suitably used for articles which are molded after surface-decorating. Examples are gauges or operation panels of vehicles, office machines, electric and electronic devices, cameras, etc.

Image forming, recording, printing, print, etc. in the present disclosure represent the same meaning.

Also, recording media, media, substrates in the present disclosure have the same meaning.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, embodiments of the present disclosure are described in detail with reference to Examples but are not limited thereto. In Examples, "parts" and "percent" are "parts by mass" and "percent by mass" unless otherwise specified.

Quinacridone Derivative Mixture 50 parts of chlorosulfonic acid was loaded into a 200 mL four-necked flask cooled in an ice water bath, and 5 parts of C.I. Pigment Red 122 (Red No. 81, manufactured by Dainichiseika Color & Chemicals Mfg. Co., Ltd.) was gradually added to the flask at a temperature of 10 to 15 degrees C. over five minutes. After further stirring at 80 degrees C. for three hours and cooling down to room temperature, the reaction solution was added to 600 parts of ice water during stirring to precipitate a sulfonate. Next, the precipitate was filtrated, rinsed with 300 parts of 0.1 percent hydrochloric acid, and further rinsed with 300 parts of deionized water to obtain a red intermediate wet cake. 150 mL of water was added to this wet cake and cooled down to 4 degrees C. in an ice water bath with stirring. 10.75 g of diethylamine was dripped to this over five minutes followed by stirring at a temperature of 70 degrees C. for three hours. After cooling down to room temperature, 15.6 g of concentrated hydrochloric acid was added with stirring, and the precipitated red precipitate was collected by filtration. This wet cake was stirred, filtered, and rinsed with deionized water, followed by heating under a reduced pressure at 60 degrees C. for two days to obtain 2.67 g of a shrimp-brown powder mixture of quinacridone derivatives represented by the following Chemical formula 1-1 and Chemical formula 1-2.

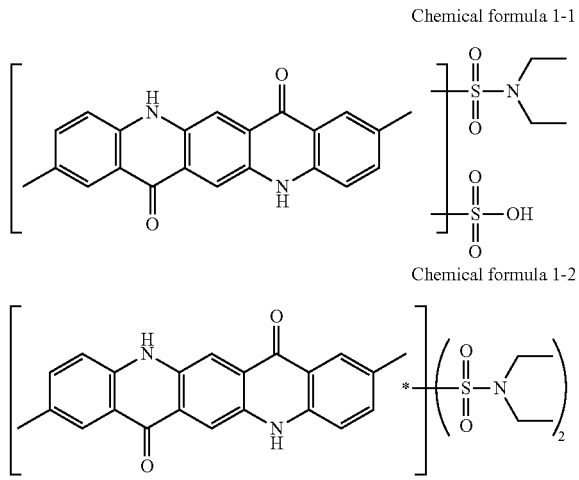

Chemical formula 1-1

Chemical formula 1-2

Copolymer 62.0 parts (525 mmol) of 1,6-hexanediol (manufactured by Tokyo Chemical Industry Co., Ltd.) was dissolved in 700 mL of methylene chloride and 20.7 parts (262 mmol) of pyridine was added. To this solution, a solution in which 50.0 parts (262 mmol) of 2-naphthalene carbonyl chloride (manufacture by Tokyo Chemical Industry Co., Ltd.) was dissolved in 100 ml of methylene chloride (manufactured by Tokyo Chemical Industry Co., Ltd.) was dripped in two hours followed by stirring at room temperature for six hours. The thus-obtained reaction solution was rinsed with water and thereafter the organic phase was isolated followed by drying with magnesium sulfate and the solvent was distilled away. The residue was refined by silica gel column chromatography with a solvent mixture of a methylene chloride and methanol as an eluent with a volume ratio of 98:2 to obtain 52.5 parts of 2-naphthoic acid-2-hydroxyethyl ester.

Next, 42.1 parts (155 mmol) of 2-naphthoic acid-2-hydroxyethyl ester was dissolved in 80 mL of dry methyl ethyl ketone and heated to 60 degrees C. To this solution, a solution in which 24.0 parts (155 mmol) of 2-methacryloyloxy ethylisocyanate (Karenz MOI, manufactured by SHOWA DENKO K.K.) was dissolved in 20 mL of dry methylketone was dripped in one hour while being stirred followed by stirring at 70 degrees C. for 12 hours. After being cooled down to room temperature, the solvent was distilled away. The residue was refined by silica gel column chromatography with a solvent mixture of a methylene chloride and methanol as an eluent with a volume ratio of 99:1 to obtain 57.0 g of the monomer represented by the following Chemical structure 3.

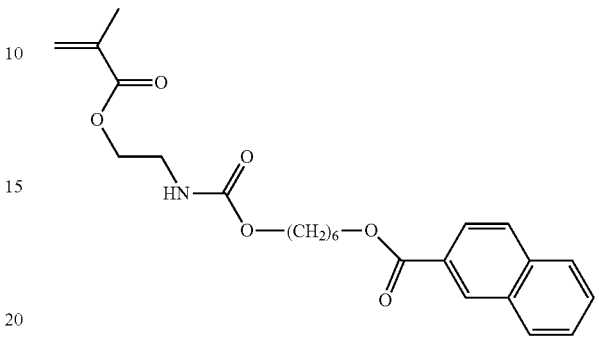

Chemical structure 3

Next, 1.20 parts (16.7 mmol) of acrylic acid (manufactured by Sigma-Aldrich Co. LLC) and 7.12 parts (16.7 mmol) of the monomer having the structure represented by Chemical structure 3 were dissolved in 40 mL of dry methyl ethyl ketone to prepare a monomer solution. 10 percent of the monomer solution was added to a 100 mL flask equipped with a condenser tube and heated to 75 degrees C. in an argon atmosphere. While stirring this solution, a solution in which 0.273 parts (1.67 mmol) of 2,2'-azoiso (butyronitrile) (manufactured by Tokyo Chemical Industry Co., Ltd.) was dissolved in the rest of the monomer solution was dripped thereto in 1.5 hours followed by further stirring at 60 degrees C. for 15 hours. The resultant was cooled down to room temperature and the thus-obtained reaction solution was dripped to hexane to precipitate a copolymer. The precipitated copolymer was filtrated followed by drying with a reduced pressure to obtain 8.13 parts of a copolymer. While dissolving the thus-obtained copolymer in dimethylethanol amine aqueous solution for 100 percent acid-neutralization, deionized water was added to control concentration in such a manner that the concentration of the copolymer was 10 percent by mass. Thus, a copolymer was obtained. Weight average molecular weight of the thus-obtained copolymer was 21,800.

Example 1

Dispersion 1

3.2 parts of the copolymer and 0.8 part of dimethylaminoethanol were loaded and dissolved in 81 parts of deionized water, and 1.0 part of the quinacridone derivative compound, which was the mixture of the compound represented by Chemical formula 1-1 and the compound represented by Chemical formula 1-2 and 14.0 parts of a quinacridone pigment (mixed crystal pigment of C.I. Pigment Red 202 and Pigment Violet 19, Cinquasia Magenta D 4500J, manufactured by BASF) were added and pre-dispersed for 10 minutes by an ultrasonic homogenizer. The resultant was loaded into Ultra Apex Mill UAM 015 type (manufactured by HIROSHIMA METAL & MACHINERY) using 0.05 mm zirconia beads and dispersed for one hour, and the thus-obtained dispersion was filtered through a 1 μm filter to obtain Dispersion 1 having a pigment concentration of 14 percent.

| Ink 1 | |
|---|---|
| Dispersion 1: | 36.0 parts |
| 3-ethyl-3-hydroxymethyl oxetane: | 1.0 part |
| 3-methyl-1,3-butane diol: | 19.0 parts |
| 1,2-propane diol: | 10.0 parts |
| 2-ethyl-1,3-hexane diol: | 2.0 parts |
| Polyoxyethylene polyoxypropylene alkyl ether (EMULGEN LS-106, manufactured by KAO CORPORATION): | 1.0 part |
| 2-amino-2-ethyl-1,3-propane diol: | 0.5 parts |
| Preservatives and fungicides (PROXEL LV, manufactured by Arch Chemicals Japan KK): | 0.1 parts |
| Deionized water: | 30.4 parts |

The components other than Dispersion 1 were dissolved in deionized water to manufacture a vehicle and thereafter the vehicle was mixed with Dispersion 1 followed by filtration with a filter having an opening diameter of 1 μm to obtain Ink 1.

Example 2

Ink 2 was obtained according to the same manner and the same formulation as in Example 1 except that 1.0 part of 3-ethyl-3-hydroxymethyl oxetane was changed to 2.0 parts and 19.0 parts of 3-methyl-1,3-butane diol was changed to 18.0 parts.

Example 3

Ink 3 was obtained according to the same manner and the same formulation as in Example 1 except that 1.0 part of 3-ethyl-3-hydroxymethyl oxetane was changed to 5.0 parts and 19.0 parts of 3-methyl-1,3-butane diol was changed to 15.0 parts.

Example 4

Ink 4 was obtained according to the same manner and the same formulation as in Example 3 except that 5.0 parts of 3-ethyl-3-hydroxymethyl oxetane was changed to 5.0 parts of tripropyleneglycol monomethylether.

Example 5

Ink 5 was obtained according to the same manner and the same formulation as in Example 1 except that 5.0 parts of 3-ethyl-3-hydroxymethyl oxetane was changed to 5.0 parts of methyltriglycol.

Example 6

Ink 6 was obtained according to the same manner and the same formulation as in Example 3 except that 5.0 parts of 3-ethyl-3-hydroxymethyl oxetane was changed to 5.0 parts of isoprovinylidene glycerol.

Example 7

Ink 7 was obtained according to the same manner and the same formulation as in Example 3 except that 5.0 parts of 3-ethyl-3-hydroxymethyl oxetane was changed to 5.0 parts of N,N-dimethyl-β-buthoxy propionamide.

Example 8

Dispersion 2 Dispersion 2 was obtained according to the same manner and the same formulation as Dispersion 1 of Example 1 except that 14.0 parts of the quinacridone pigment (mixed crystal pigment of C.I. Pigment Red 202 and Pigment Violet 19, Cinquasia Magenta D 4500J, manufactured by BASF) was changed to 14.0 parts of a quinacridone pigment (C.I. Pigment Red 122, Red No. 81, manufactured by Dainichiseika Color & Chemicals Mfg. Co., Ltd.).

Ink 8

Ink 8 was obtained according to the same manner and the same formulation as Ink 3 of Example 3 except that Dispersion 1 was changed to Dispersion 2.

Example 9

Dispersion 3

Dispersion 3 was obtained according to the same manner and the same formulation as Dispersion 1 of Example 1 except that 14.0 parts of the quinacridone pigment (mixed crystal pigment of C.I. Pigment Red 202 and Pigment Violet 19, Cinquasia Magenta D 4500J, manufactured by BASF) was changed to 14.0 parts of a quinacridone pigment (C.I. Pigment Violet 19, Ink Jet MAGENTA ESB, manufactured by Clariant (Japan) K.K.).

Ink 9

Ink 9 was obtained according to the same manner and the same formulation as Ink 3 of Example 3 except that Dispersion 1 was changed to Dispersion 3.

Example 10

Dispersion 4

Dispersion 4 was obtained according to the same manner and the same formulation as Dispersion 1 of Example 1 except that 14.0 parts of the quinacridone pigment (mixed crystal pigment of C.I. Pigment Red 202 and Pigment Violet 19, Cinquasia Magenta D 4500J, manufactured by BASF) was changed to 14.0 parts of a quinacridone pigment (mixed crystal pigment of C.I. Pigment Red 122 and Pigment Violet 19, FASTGEN SUPER Magenta RE-05, manufactured by DIC Corporation).

Ink 10

Ink 10 was obtained according to the same manner and the same formulation as Ink 3 of Example 3 except that Dispersion 1 was changed to Dispersion 4.

Example 11

Dispersion 5

Dispersion 5 was obtained according to the same manner and the same formulation as Dispersion 1 of Example 1 except that 14.0 parts of the quinacridone pigment (mixed crystal pigment of C.I. Pigment Red 202 and Pigment Violet 19, Cinquasia Magenta D 4500J, manufactured by BASF) was changed to 14.0 parts of an azo pigment (C.I. Pigment Red 184, Naphtol Carmine 6B, manufactured by Cappelle Pigment NV).

Ink 11

Ink 11 was obtained according to the same manner and the same formulation as Ink 3 of Example 3 except that Dispersion 1 was changed to Dispersion 5.

Example 12

Dispersion 6

Dispersion 6 was obtained according to the same manner and the same formulation as Dispersion 1 of Example 1 except that 14.0 parts of the quinacridone pigment (mixed crystal pigment of C.I. Pigment Red 202 and Pigment Violet 19, Cinquasia Magenta D 4500J, manufactured by BASF) was changed to 14.0 parts of an azo pigment (C.I. Pigment Red 150, Pigment Red 150, manufactured by Fuji Pigment Co., Ltd.).

Ink 12

Ink 12 was obtained according to the same manner and the same formulation as Ink 3 of Example 3 except that Dispersion 1 was changed to Dispersion 6.

Example 13

Ink 13
Dispersion 1: 36.0 parts
3-ethyl-3-hydroxymethyl oxetane: 5.0 parts
3-methyl-1,3-butane diol: 10.0 parts
1,2-propane diol: 10.0 parts
2-ethyl-1,3-hexane diol: 2.0 parts
Polyoxyethylene polyoxypropylene alkyl ether (EMULGEN LS-106, manufactured by KAO CORPORATION): 1.0 part
Urethane resin emulsion (Takelac W-6110, 32.0 percent aqueous liquid dispersion, manufactured by Mitsui Chemicals, Inc.,): 12.5 parts
2-amino-2-ethyl-1,3-propane diol: 0.5 parts
Preservatives and fungicides (PROXEL LV, manufactured by Arch Chemicals Japan KK): 0.1 parts
Deionized water: 22.9 parts The components other than Dispersion 1 were dissolved in deionized water to manufacture a vehicle and thereafter the vehicle was mixed with Dispersion 1 followed by filtration with a filter having an opening diameter of 1 μm to obtain Ink 13.

Example 14

Ink 14
Dispersion 1: 36.0 parts
3-ethyl-3-hydroxymethyl oxetane: 5.0 parts
3-methyl-1,3-butane diol: 10.0 parts
1,2-propane diol: 10.0 parts
2-ethyl-1,3-hexane diol: 2.0 parts
Polyoxyethylene polyoxypropylene alkyl ether (EMULGEN LS-106, manufactured by KAO CORPORATION): 1.0 part
Acrylic resin emulsion (NANOCLYL-S KPX, 40.0 percent aqueous liquid dispersion manufactured by TOYOCHEM CO., LTD.): 10.0 parts
2-amino-2-ethyl-1,3-propane diol: 0.5 parts
Preservatives and fungicides (PROXEL LV, manufactured by Arch Chemicals Japan KK): 0.1 parts
Deionized water: 25.4 parts The components other than Dispersion 1 were dissolved in deionized water to manufacture a vehicle and thereafter the vehicle was mixed with Dispersion 1 followed by filtration with a filter having an opening diameter of 1 μm to obtain Ink 14.

Example 15

Ink 15 was obtained according to the same manner and same formulation as in Example 3 except that 1.0 part of polyethylene wax (AQUACER 531, 45.0 percent aqueous liquid dispersion, manufactured by BYK Japan KK) was added and the amount of deionized water was changed from 30.4 parts to 29.4 parts.

Example 16

Ink 16 was obtained according to the same manner and the same formulation as in Example 3 except that 1.0 part of polyether-modified siloxane compound represented by Chemical formula 2-2 was added and the amount of deionized water was changed from 30.4 parts to 29.4 parts.

Example 17

Ink 17 was obtained according to the same manner and the same formulation as in Example 1 except that 1.0 part of 3-ethyl-3-hydroxymethyl oxetane was changed to 7.8 parts and 19.0 parts of 3-methyl-1,3-butane diol was changed to 12.2 parts.

Example 18

Ink 18 was obtained according to the same manner and the same formulation as in Example 1 except that 1.0 part of 3-ethyl-3-hydroxymethyl oxetane was changed to 8.5 parts and 19.0 parts of 3-methyl-1,3-butane diol was changed to 11.5 parts.

Example 19

Ink 19 was obtained according to the same manner and the same formulation as in Example 1 except that 1.0 part of 3-ethyl-3-hydroxymethyl oxetane was changed to 9.8 parts and 19.0 parts of 3-methyl-1,3-butane diol was changed to 10.2 parts.

Comparative Example 1

Ink 20 was obtained according to the same manner and the same formulation as in Example 3 except that 5.0 parts of 3-ethyl-3-hydroxymethyl oxetane was changed to 12.0 parts and 15.0 parts of 3-methyl-1,3-butane diol was changed to 8.0 parts.

Comparative Example 2

Ink 21 was obtained according to the same manner and the same formulation as in Example 3 except that 5.0 part of 3-ethyl-3-hydroxymethyl oxetane was changed to 5.0 parts of 2-pyrolidone.

Comparative Example 3

Ink 22 was obtained according to the same manner and the same formulation as in Example 1 except that 5.0 parts of 3-ethyl-3-hydroxymethyl oxetane was changed to 5.0 parts of glycerin.

Comparative Example 4

Dispersion 7 Dispersion 7 was obtained in the same manner and the same formulation as Dispersion 1 of Example 1 except that 1.0 part of the quinacridone derivative mixture, which was a mixture of the compound represented by Chemical formula 1-1 and the compound represented by Chemical formula 1-2 was not added but 14.0 parts of the quinacridone pigment (mixed crystal pigment of C.I. Pigment Red 202 and Pigment Violet 19, Cinquasia Magenta D 4500J, manufactured by BASF) was changed to 15.0 parts.

Ink 23

Ink 23 was obtained according to the same manner and the same formulation as Ink 3 of Example 3 except that Dispersion 1 was changed to Dispersion 7.

TABLE 2

| Example/Comparative Example | Ink | Dispersion | Solvent | | | | | | | | | |
|---|---|---|---|---|---|---|---|---|---|---|---|---|
| | | | EHO | IPDG | B100 | MFTG | MTG | MBD | 12PD | 2P | GLY | 2E13HD |
| Example 1 | Ink 1 | 36.0% | 1.0% | | | | | 19.0% | 10.0% | | | 2.0% |
| Example 2 | Ink 2 | 36.0% | 2.0% | | | | | 18.0% | 10.0% | | | 2.0% |
| Example 3 | Ink 3 | 36.0% | 5.0% | | | | | 15.0% | 10.0% | | | 2.0% |
| Example 4 | Ink 4 | 36.0% | | | | 5.0% | | 15.0% | 10.0% | | | 2.0% |
| Example 5 | Ink 5 | 36.0% | | | | | 5.0% | 15.0% | 10.0% | | | 2.0% |
| Example 6 | Ink 6 | 36.0% | | 5.0% | | | | 15.0% | 10.0% | | | 2.0% |
| Example 7 | Ink 7 | 36.0% | | | 5.0% | | | 15.0% | 10.0% | | | 2.0% |
| Example 8 | Ink 8 | 36.0% | 5.0% | | | | | 15.0% | 10.0% | | | 2.0% |
| Example 9 | Ink 9 | 36.0% | 5.0% | | | | | 15.0% | 10.0% | | | 2.0% |
| Example 10 | Ink 10 | 36.0% | 5.0% | | | | | 15.0% | 10.0% | | | 2.0% |
| Example 11 | Ink 11 | 36.0% | 5.0% | | | | | 15.0% | 10.0% | | | 2.0% |
| Example 12 | Ink 12 | 36.0% | 5.0% | | | | | 15.0% | 10.0% | | | 2.0% |
| Example 13 | Ink 13 | 36.0% | 5.0% | | | | | 10.0% | 10.0% | | | 2.0% |
| Example 14 | Ink 14 | 36.0% | 5.0% | | | | | 10.0% | 10.0% | | | 2.0% |
| Example 15 | Ink 15 | 36.0% | 5.0% | | | | | 15.0% | 10.0% | | | 2.0% |
| Example 16 | Ink 16 | 36.0% | 5.0% | | | | | 15.0% | 10.0% | | | 2.0% |
| Example 17 | Ink 17 | 36.0% | 7.8% | | | | | 12.2% | 10.0% | | | 2.0% |
| Example 18 | Ink 18 | 36.0% | 8.5% | | | | | 11.5% | 10.0% | | | 2.0% |
| Example 19 | Ink 19 | 36.0% | 9.8% | | | | | 10.2% | 10.0% | | | 2.0% |
| Comparative Example 1 | Ink 20 | 36.0% | 12.0% | | | | | 8.0% | 10.0% | | | 2.0% |
| Comparative Example 2 | Ink 21 | 36.0% | | | | | | 15.0% | 10.0% | 5.0% | | 2.0% |
| Comparative Example 3 | Ink 22 | 36.0% | | | | | | 15.0% | 10.0% | | 5.0% | 2.0% |
| Comparative Example 4 | Ink 23 | 36.0% | 5.0% | | | | | 15.0% | 10.0% | | | 2.0% |

| Example/Comparative Example | Surfactant | | Resin emulsion | | Wax | pH Adjustment | Antifungal | Ion exchange water |
|---|---|---|---|---|---|---|---|---|
| | LS106 | Formula (2-2) | W6110 | KPX | AQ531 | AEPD | LV | |
| Example 1 | 1.0% | | | | | 0.5% | 0.1% | 30.4% |
| Example 2 | 1.0% | | | | | 0.5% | 0.1% | 30.4% |
| Example 3 | 1.0% | | | | | 0.5% | 0.1% | 30.4% |
| Example 4 | 1.0% | | | | | 0.5% | 0.1% | 30.4% |
| Example 5 | 1.0% | | | | | 0.5% | 0.1% | 30.4% |
| Example 6 | 1.0% | | | | | 0.5% | 0.1% | 30.4% |
| Example 7 | 1.0% | | | | | 0.5% | 0.1% | 30.4% |
| Example 8 | 1.0% | | | | | 0.5% | 0.1% | 30.4% |
| Example 9 | 1.0% | | | | | 0.5% | 0.1% | 30.4% |
| Example 10 | 1.0% | | | | | 0.5% | 0.1% | 30.4% |
| Example 11 | 1.0% | | | | | 0.5% | 0.1% | 30.4% |
| Example 12 | 1.0% | | | | | 0.5% | 0.1% | 30.4% |
| Example 13 | 1.0% | | 12.5% | | | 0.5% | 0.1% | 30.4% |
| Example 14 | 1.0% | | | 10.0% | | 0.5% | 0.1% | 30.4% |
| Example 15 | 1.0% | | | | 1.0% | 0.5% | 0.1% | 30.4% |
| Example 16 | 1.0% | 1.0% | | | | 0.5% | 0.1% | 30.4% |
| Example 17 | 1.0% | | | | | 0.5% | 0.1% | 30.4% |
| Example 18 | 1.0% | | | | | 0.5% | 0.1% | 30.4% |
| Example 19 | 1.0% | | | | | 0.5% | 0.1% | 30.4% |
| Comparative Example 1 | 1.0% | | | | | 0.5% | 0.1% | 30.4% |
| Comparative Example 2 | 1.0% | | | | | 0.5% | 0.1% | 30.4% |
| Comparative Example 3 | 1.0% | | | | | 0.5% | 0.1% | 30.4% |
| Comparative Example 4 | 1.0% | | | | | 0.5% | 0.1% | 30.4% |

| Abbreviation | Name | SP value |
|---|---|---|
| EHO | 3-Ethyl-3-hydroxymethyloxetane | 10.7 |
| IPDG | Isopropylidene glycerol | 9.8 |
| B100 | N,N-dimethyl-β-butoxypropionamide | 9.8 |
| MFTG | Tripropylene glycol monomethyl ether | 9.4 |
| MTG | Methyltriglycol | 10.1 |
| MBD | 3-Methyl-1,3-butanediol | 12.1 |
| 12PD | 1,2 Propanediol | 13.5 |
| 2P | 2-Pyrrolidone | 11.2 |
| GLY | Glycerin | 16.4 |
| 2E13HD | 2-Ethyl-1,3-hexanediol | 11.1 |
| LS106 | Emulgen LS-106 (surfactant) | |
| W6110 | Takelac W-6110 (urethane resin emulsion) | |
| KPX | NACOCRYL-S KPX (acrylic resin emulsion) | |
| AQ531 | AQUACER 531 (wax) | |
| AEPD | 2-Amino-2-ethyl-1,3-propanediol (pH adjusted) | |
| LV | Proxel LV (antiseptic and antifungal agent) | |

Storage Stability of Ink

An ink cartridge was filled with each ink and stored at 70 degrees C. for 14 days. The change rate of the viscosity after storage to the viscosity before storage was obtained from the following relation and evaluated according to the following criteria.

Change rate of viscosity (%)=(Viscosity of ink after storage−Viscosity of ink before storage)/(Viscosity of ink before storage)×100

The viscosity was measured by a viscometer (RE80L, manufactured by TOKI SANGYO CO., LTD.) to measure the viscosity of the ink at 25 degrees C. at 50 rotations or 100 rotations. The evaluation results are shown in Table 3.

Evaluation Criteria
A: Change rate of viscosity within + or −5%
B: Change rate of viscosity within the range of from −10% to less than −5% and more than 5% to 10%
C: Change rate of viscosity within the range of from −30% to less than −10% and more than 10% to 30%.
D: Change rate of viscosity less than 30% or greater than 30% (gelated to the degree that evaluation was not possible)

Ink Discharging Device

The ink prepared in Examples and Comparative Examples was set in an inkjet printer (IPSiO GX-e5500, manufactured by Ricoh Co., Ltd.) and a print chart having a print area of 5 percent was printed on 1,000 sheets using this inkjet printer. After 24 hour downtime after the completion of the printing, evaluation of the ink was made on the following discharging stability, saturation, beading, and drying property. The evaluation criteria are as follows. The results are shown in Table 3.

Discharging Stability

Using the ink discharging device, all the nozzles dummy-discharged for one hour. One hour later, a nozzle check pattern was printed on a glossy inkjet paper (KASSAI photographic finishing Value, manufactured by FUJIFILM Corporation), and the number of the discharging nozzles that had discharged the ink was counted to the total number of nozzles 384. The results are shown in Table 3.

Evaluation Criteria
A: The number of nozzles that had discharged was 384 (all the nozzles had discharged)
B: The number of nozzles that had discharged was 368 or greater (no problem for practical use)
C: The number of nozzles that had discharged was from 192 to less than 368
D: The number of nozzles that had discharged was less than 192

Saturation

A solid image of 5 cm square was formed on a recording medium (OK TopKote+, 104.7 g/m$^2$, manufactured by OJI PAPER CO., LTD.) with a pixel density of 1200 dpi×1200 dpi and the image portion was dried for 30 seconds in a thermostatic oven in which the internal temperature was set at 100 degrees C. A reflection-type, color spectrophotometric densitometer (manufactured by X-Rite Inc.) was used to measure the value of L*a*b, and the value of C* was calculated from a* and b* measurements and evaluated according to the following criteria. The grades A and B are allowable.

Evaluation Criteria
A: C* is 75 or greater
B: C* is from 70 to less than 75
C: C* is from 65 to less than 70
D: C* is less than 65

Beading

A solid image of 5 cm square was formed in the same manner as for the evaluation on saturation and visually checked for evaluation on beading.

Evaluation Criteria
A: No beading occurred (beading invisible at a distance of 15 cm).
B: Very slight beading occurred (visible at a distance of 15 cm but invisible at a distance of 50 cm)
C: Slight beading occurred (visible at a distance of 50 cm but invisible at a distance of one meter).
D: Significant beading occurred (visible at a distance of one meter).

Drying Property

Blank paper of 4 cm square, on which no image was printed, was overlaid on the solid image of 5 cm square formed in the same manner as for the evaluation on saturation. A rubber sheet having a length of 2 cm, a width of 2 cm, and a thickness of 0.2 cm was placed on the center of the paper in such a manner that the pressure applied to the paper by the rubber sheet was 0.5 kgf/cm$^2$ and left at 23 degrees C. and 50 percent RH for 12 hours. Thereafter, the blank paper was detached. The degree of transfer of the pigment thereto was visually checked and evaluated according to the following evaluation criteria on drying property.

Evaluation Criteria
A: Transfer of pigment to blank paper never or little observed and paper was not attached to image
B: Transfer of pigment to blank paper never or little observed but paper was attached to image
C: Transfer of pigment to blank paper slightly observed (less than 10 percent area of the entire paper)
D: Transfer of pigment to blank paper clearly observed (not less than 10 percent area of the entire paper)

TABLE 3

| | Storage Stability | Discharging stability | Saturation | Beading | Drying Property |
|---|---|---|---|---|---|
| Example 1 | B | A | B | B | B |
| Example 2 | A | A | A | A | A |
| Example 3 | A | A | A | A | A |
| Example 4 | B | A | A | A | B |
| Example 5 | B | A | A | A | B |
| Example 6 | B | A | A | A | A |
| Example 7 | A | A | A | A | A |
| Example 8 | A | A | B | A | A |
| Example 9 | A | A | B | A | A |
| Example 10 | A | A | B | A | A |
| Example 11 | B | B | B | A | A |
| Example 12 | B | B | B | A | A |
| Example 13 | A | A | A | A | A |
| Example 14 | A | B | A | A | A |
| Example 15 | A | B | A | A | A |
| Example 16 | A | A | A | A | A |
| Example 17 | A | A | A | A | B |
| Example 18 | B | B | B | B | B |
| Example 19 | B | B | B | B | B |
| Comparative Example 1 | C | B | A | A | C |
| Comparative Example 2 | A | A | A | C | A |
| Comparative Example 3 | A | A | B | D | C |
| Comparative Example 4 | D | C | B | A | A |

Having now fully described embodiments of the present invention, it will be apparent to one of ordinary skill in the art that many changes and modifications can be made thereto without departing from the spirit and scope of embodiments of the invention as set forth herein.

What is claimed is:

1. An ink, comprising:
   a pigment;
   a quinacridone derivative represented by the following chemical formula 1,

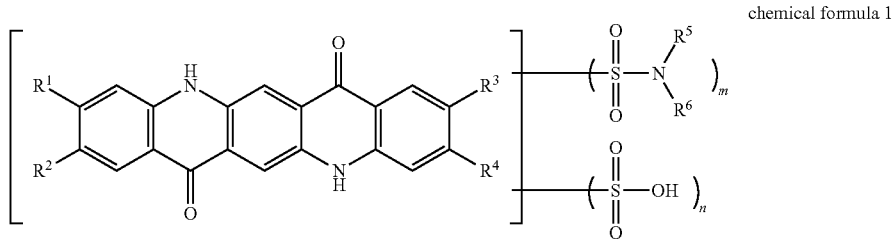

chemical formula 1 where $R^1$, $R^2$, $R^3$ and $R^4$ each, independently represent hydrogen atoms, halogen atoms, or alkyl groups having 1 to 4 carbon atoms, $R^5$ and $R^6$ each, independently represent alkyl groups having 1 to 4 carbon atoms, and m and n each, independently represent 0, 1, or 2, excluding a case where both m and n are simultaneously 0; and
   a solvent A having an SP value of from 9.0 to 11.0,
   wherein a proportion of the solvent A in the ink is less than 10 percent by mass.

2. The ink according to claim 1, wherein a proportion of the solvent A in the ink is from 2 to 8 percent by mass.

3. The ink according to claim 1, wherein a mass ratio of the quinacridone derivative to the pigment is from 0.01 to 0.10 in the ink.

4. The ink according to claim 1, wherein a proportion of the quinacridone derivative in the ink is from 0.01 to 1.00 percent by mass.

5. The ink according to claim 4, wherein a ratio of the quinacridone derivative to the solvent A is from 0.045 to 0.18 in the ink.

6. The ink according to claim 1, wherein the solvent A is at least one member selected from the group consisting of 3-ethyl-3-hydroxymethyloxetane, isopropylidene glycerol, and N, N-Dimethyl-β-butoxypropionamide.

7. The ink according to claim 1, wherein the pigment comprises a quinacridone pigment.

8. The ink according to claim 1, wherein the pigment comprises Colour Index ("C.I.") Pigment Red 122, C.I. Pigment Violet 19, a mixed crystal of C.I. Pigment Red 122 and C.I. Pigment Violet 19, or a mixed crystal of C.I. Pigment Red 202 and C.I. Pigment Violet 19.

9. The ink according to claim 1, further comprising a resin emulsion comprising an acrylic resin or a urethane resin.

10. The ink according to claim 1, further comprising a polyethylene wax.

11. The ink according to claim 1, further comprising a polyether-modified siloxane compound.

12. An ink container comprising:
    a container; and
    the ink of claim 1 accommodated in the container.

13. An inkjet recording device comprising:
    the ink container of claim 12; and
    a discharging device configured to discharge ink supplied from the ink container of claim 12.

14. A recording method comprising:
    applying the ink of claim 1 to a recording medium.

* * * * *